US006999431B2

(12) United States Patent
Rines

(10) Patent No.: US 6,999,431 B2
(45) Date of Patent: Feb. 14, 2006

(54) VOICE OVER INTERNET PROTOCOL

(75) Inventor: Clark C. Rines, Chandler, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 990 days.

(21) Appl. No.: 09/788,229

(22) Filed: Feb. 17, 2001

(65) Prior Publication Data

US 2002/0114318 A1 Aug. 22, 2002

(51) Int. Cl.
*H04Q 7/00* (2006.01)

(52) U.S. Cl. .................. 370/328; 338/483; 338/401

(58) Field of Classification Search ........ 370/248–253, 370/352–356, 389–392, 401, 408, 383, 328, 370/338
See application file for complete search history.

(56) References Cited

U.S. PATENT DOCUMENTS

| | | | |
|---|---|---|---|
| 4,608,460 A | 8/1986 | Carter | |
| 4,734,931 A | 3/1988 | Bourg | |
| 4,979,206 A | 12/1990 | Padden | |
| 5,850,433 A | 12/1998 | Rondeau | |
| 5,884,262 A * | 3/1999 | Wise et al. .............. 704/270.1 | |
| 5,940,479 A | 8/1999 | Guy et al. | |
| 5,940,834 A | 8/1999 | Pinard et al. | |
| 5,943,410 A | 8/1999 | Shaffer et al. | |
| 5,946,386 A | 8/1999 | Rogers et al. | |
| 5,950,165 A | 9/1999 | Shaffer et al. | |
| 5,963,618 A | 10/1999 | Porter | |
| 5,999,609 A | 12/1999 | Nishimura | |
| 5,999,965 A | 12/1999 | Kelly | |
| 6,014,711 A | 1/2000 | Brown | |
| 6,020,916 A | 2/2000 | Gerszberg et al. | |
| 6,021,428 A | 2/2000 | Miloslavsky | |
| 6,049,594 A | 4/2000 | Furman | |
| 6,366,913 B1 * | 4/2002 | Fitler et al. .................... 707/9 |
| 6,385,584 B1 * | 5/2002 | McAllister et al. ......... 704/275 |
| 6,404,746 B1 * | 6/2002 | Cave et al. .................. 370/262 |
| 6,539,382 B1 * | 3/2003 | Byrne et al. .................. 707/10 |
| 6,564,264 B1 * | 5/2003 | Creswell et al. ............ 709/245 |
| 6,625,595 B1 * | 9/2003 | Anderson et al. .............. 707/3 |
| 6,678,280 B1 * | 1/2004 | Kim et al. .................. 370/429 |
| 6,731,625 B1 * | 5/2004 | Eastep et al. ............... 370/352 |
| 6,754,181 B1 * | 6/2004 | Elliott et al. ................ 370/252 |
| 6,757,364 B1 * | 6/2004 | Newkirk .................. 379/88.16 |
| 6,760,324 B1 * | 7/2004 | Scott et al. ................. 370/352 |
| 6,765,931 B1 * | 7/2004 | Rabenko et al. ............ 370/493 |
| 6,826,398 B1 * | 11/2004 | Lagerstrom et al. ........ 455/433 |

* cited by examiner

*Primary Examiner*—Zarni Maung
*Assistant Examiner*—Van Kim T. Nguyen
(74) *Attorney, Agent, or Firm*—Michelle Whittington

(57) ABSTRACT

A voice over Internet protocol (VOIP) directory service for communications users of an enterprise locates a telephone or work station of a called party for the purpose of setting up real-time communication, either from a pulse code modulation (PCM) telephone or from an Internet protocol (IP) telephone, or a computer by way of the world wide web, using a common directory database. Once the directory entry has been found, it may be immediately called through use of translated addresses assigned to the selected called party device.

9 Claims, 3 Drawing Sheets

VOICE OVER INTERNET PROTOCOL

RELATED APPLICATION

This application is related to co-pending application Ser. No. 09/666,758, filed on Sep. 21, 2000.

BACKGROUND

Systems have been designed to allow telephone subscribers to place calls directly, without the assistance of an attendant, after calling the main telephone number of a business. With the growing popularity of low cost DTMF (dual-tone multi-frequency) dial systems in the late 1970s and early 1980s, various solutions have been proposed to encode the dialed digits and then translate them to subscriber's names and refer callers to a database for a list of numbers served by the PBX (private branch exchange) of the called party.

The U.S. Pat. No. 4,608,460 to Carter is directed to such a system. Because a DTMF dial, however, is limited to twelve keys, a variety of translation schemes have been employed to make the translation. The end result, essentially, is always the same. The dialed digits represent an approximation of the alphabetically stored data for the intended party's name; and often this requires several attempts before the desired party can be located. If the directory of potential called parties is relatively limited, the system of Carter can be effective, and employs vocally conveyed information from a speech synthesizer relating the other subscriber to the caller; whereupon the caller selects the other subscriber (called party) in response to the vocally conveyed information to effect the connection.

In the U.S. Pat. No. 4,734,931 to Bourg, a distributed calling directory uses a computer interface to a central database to present the information to the calling party's computer terminal to assist with the dialing. This system is particularly useful by dedicated users, such as hotel desk managers, to look up information in order to intelligently process calls. The system, however, does not automatically provide inbound callers with the directory information.

An effort to resolve the problems associated with DTMF dialing is disclosed in the U.S. Pat. No. 4,979,206 to Padden. In the system of the Padden patent, a caller requesting directory assistance is connected to an automatic speech recognition unit, and is prompted to speak commands for identifying the requested directory number. A speech recognition unit in the system converts the received speech signals into data signals for searching a directory number database. If a directory listing is located, the number of that listing is announced to the calling party; and the calling party is prompted to speak a command indicating whether a call to that number should be established. Because of the wide variety of names and pronunciation of names which exist, the system of the Padden patent, and systems similar to it, are subject to shortcomings in accuracy, and often send callers to an attendant or operator because the required name did not appear on file through the spoken name.

A different approach is disclosed in the U.S. Pat. No. 5,850,433 to Rondeau. In the system of this patent, the video display of a personal computer is employed to provide an immediately visible directory reference from a computer server database. The computer user is then allowed to select the desired directory entry and to place a call to the intended party using a voice link over a second communications line, or an encoded voice stream directly to the personal computer. The approach used in the system of this patent, however, requires a separate computer database which often contains additional clutter, such as advertising, with no integration with the main telephone or employee directory of a business or other enterprise.

The U.S. Pat. No. 6,014,711 to Brown is directed to a voice over Internet identifier for a directory to allow voice messages to be sent to a recipient over an Internet mail connection when at least one unique identifier for the recipient is known, but when the electronic mail address of the recipient is unknown. The identifier used may be the telephone number of the recipient, which then is used by the system to translate the link to the e-mail address. The user then may complete the link by addressing the recipient at the e-mail address. Basically, the system of this patent is an information message to the calling party desiring to effect a voice connection over an e-mail address link.

Another approach is disclosed in the U.S. Pat. No. 5,999,609 to Nishimura. This patent is directed to a system for processing call requests through the telephone network, under the direction of the caller, who graphically manipulates the call through a graphical user interface on a personal computer. The system requires a personal computer display.

The U.S. Pat. No. 6,049,594 to Furman is directed to a system for automatic vocabulary generation for voice dialing. The system of this patent utilizes the storage of the record of the past calling records of each calling party to determine the called parties most likely to be called by this calling party. The voice recognition system then operates, first with the previously stored called parties to determine whether there is a match for any new call.

It is desirable to provide an on-line directory service for a business or enterprise which allows callers using either PCM telephones or IP telephones or computers to call others within the business or enterprise through access to an enterprise-wide database of directory information, including translation tables for communicating between PCM and IP devices.

SUMMARY OF THE INVENTION

It is an object of this invention to provide an improved enterprise or business directory system and method.

It is another object of this invention to provide an improved voice over Internet protocol (VOIP) directory which, upon acceptance from the caller to place a call, forms automatic translation to an appropriate format to place a call attempt in real time.

It is an additional object of this invention to provide a voice over Internet protocol (VOIP) gateway integrated with the PBX of an enterprise to allow callers from either PCM telephones or Internet protocol (IP) telephones to locate and attempt live contact with a person within an enterprise who has been listed within the translation tables of a directory in the VOIP gateway.

In accordance with a preferred embodiment of the invention, a voice over Internet protocol (VOIP) system for supporting real time communications for both pulse code modulation (PCM) telephone networks and Internet protocol (IP) telephone packet networks is provided. The system includes a directory of PCM, IP and URL addresses. IP addresses could include URLs as is used in SIP. It also includes a translation address database for members of the enterprise having IP terminals, addresses for IP telephones with Internet connectivity, and addresses of other gateways on the Internet. A VOIP gateway is linked with the directory, and is connected to receive requests from both PCM and IP telephones. The VOIP gateway provides voice prompts and responses to calling party requests in the form of either DTMF digits or voice signals. The VOIP gateway also operates in response to a calling party approval to automatically process the link between the calling party and the called party using, when necessary, translated addresses assigned in the directory database, to the called party.

DETAILED DESCRIPTION

Figure 1:
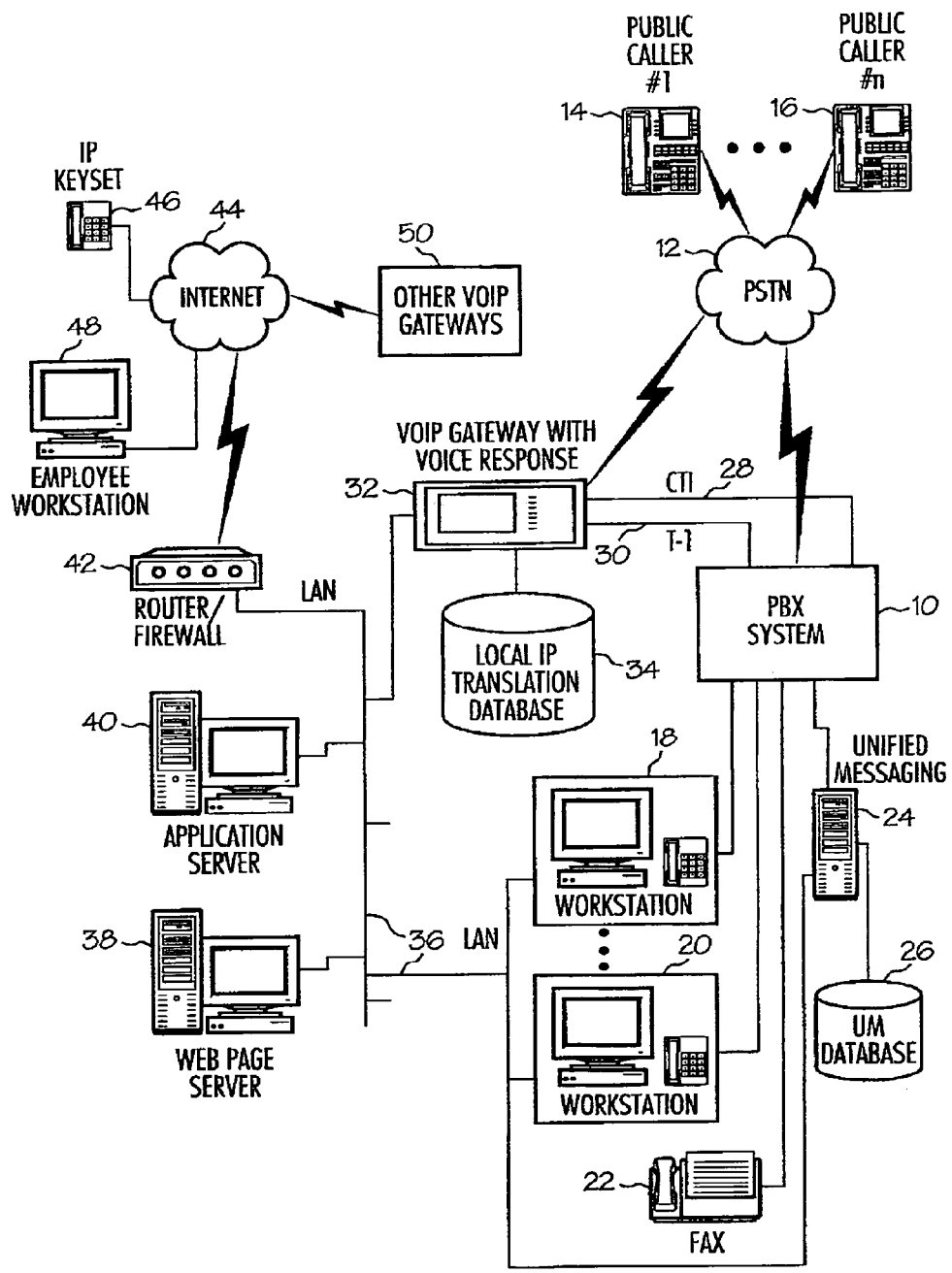
FIG. 1 is a schematic diagram of a preferred embodiment of the invention.

Reference now should be made to the drawings, in which the same reference numbers are used throughout the different figures to designate the same or similar components. FIG. 1 is a block system diagram of a preferred embodiment of the invention in a configuration best suited for a business or enterprise with a single location and no web or Internet client access for real time calling. The system shown in FIG. 1 includes several different parts which already exist in conjunction with a small business application, such as a PBX system 10 coupled with a public switched telephone network (PSTN) 12. In addition, the business includes a local area network (LAN) 36 coupled through a firewall 42 to the Internet or worldwide computer network 44.

The PSTN 12 is connected, as is well known, to public telephones, such as public telephone 14 and public telephone 16, representative of all of the various public telephones which have specific addresses or numbers for communicating with one another through the PSTN 12, and through the PSTN 12 to telephones for the business or enterprise served by the PBX system 10. The PBX system 10 of the small business or enterprise is shown as coupled with work stations and telephone keysets 18 and 20, which are representative of the various connections handled through the PBX system 10 at that business or enterprise. In addition, facsimile receivers 22 are served by the PBX system 10. Typically such systems also include unified messaging units 24 operating with a unified messaging database 26 in a conventional manner to provide messages for stations which do not answer calling party requests.

In the system shown in FIG. 1, the PBX 10 also is coupled with a voice over Internet protocol (VOIP) gateway 32 through a T-1 trunk 30 and a CTI trunk 28. The VOIP gateway 32 is connected to answer both calls from the PSTN 12 and calls that are transferred from the local PBX 10, as indicated by the various interconnections in FIG. 1. The locally installed directory in the gateway 32 contains a translation database 34 for members of the business enterprise coupled with a local area network (LAN) 36, which has IP terminals, addresses for IP telephones (display keyset devices on the LAN) with Internet connectivity, and the addresses of other VOIP gateways on the Internet, such as the gateway 50 shown coupled to the Internet 44 in FIG. 1. Also coupled to the LAN 36 are a web page server 38 and an application server 40 which operate in a conventional manner for the business enterprise.

The directory service, coupled with a local IP translation database 34 in the VOIP gateway 32, allows a caller connected with the VOIP gateway 32, from any one of the variety of sources already mentioned, to find a desired called party by keying in codes from the calling party telephone handset or computer keyboard, or by pronouncing the name of the desired called party. The nature of a two-way response system for accomplishing this is known, and disclosed, for example, in U.S. Pat. No. 4,608,460 mentioned above.

Once the keyed in code or voice input has been received by the VOIP gateway 32, the speech decoder in the gateway or the DTMF decoder responds with the nearest match to the selection which is found in the directory database in the VOIP gateway 32. The response is a voice response, from either stored speech provided by the user or a text-to-speech representation of characters entered into the database. In addition, the system employs both "find next" and "find previous" functions to accurately access the desired name through communication with the calling party. Once the desired name has been heard from the built-in voice response unit (VRU) in the VOIP gateway 32, the caller gives approval in a conventional manner. The call then is processed in real time using the translated address in the directory assigned to the selected VOIP device. Disconnection is provided at the end of the call, either by encountering a disconnect message or loss of the data from the VOIP device, or by receipt of a disconnect signal from the PSTN/PBX connections.

It should be noted that the system allows seamless communication between devices of different types through the VOIP gateway 32. In the system shown in FIG. 1, the VOIP gateway unit 32 combines the functions of gateway VRU and directory lookup tables, rather than relying on physically separate servers for the directory and the VRU. In the embodiment shown in FIG. 2, the system may be expanded to a multi-machine architecture when installed as part of a larger business enterprise.

The VOIP gateway unit 32 of FIG. 1 includes a control chassis with a CPU, memory, mass storage devices, disk drives, digital signal processor (DSP), arrays to convert between voice and data signals, an operating system, and various software applications to operate the gateway 32 in accordance with the installed application. These components are conventional; and their implementation in the system shown in FIG. 1 is effected in order to achieve the real time communication between conventional pulse code modulation (PCM) telephones and Internet protocol (IP) telephones operating over packet networks.

Storage of the user directory is provided within the control chassis of the VOIP gateway 32, and is logically separated into one database record per user. This means that each station has a single database record in the directory, whether that station is one connected to the PBX system, such as the stations 18 and 20, or is a station coupled with the LAN 36 of the business enterprise. Each record in the directory contains the appropriate fields to uniquely identify the user by name and number codes required to translate between the PSTN and LAN environments. The directory is integrated with the user's computer network in such a way that it can be manually administered or automatically updated, as the PBX unified messaging and network addresses change their assignments. The manner of updating the directory is not important to an understanding of this invention, since directory updates can be effected in a variety of well known conventional ways.

A typical operation of the system involves the translation of calls coming into the business enterprise LAN-based terminals from the PSTN 12 and the placement of calls from the LAN 36 out to the PSTN. The VOIP gateway 32 performs the function of translation from telephone number to IP address, and vice-versa, in a manner which is transparent to the users of the system.

The system shown in FIG. 1 provides an established path between employees who are working at home, or are connected to the Internet 44 while traveling. For example, such employees may have an employee work station 48 or an IP keyset 46 coupled to the Internet 44, or may be located at any location where they may connect with the Internet 44 in any conventional manner. Because such devices use the Internet protocol (IP), they require the services of the gateway 32 and its included directory to place calls to either the PSTN 12 or stations connected to the PBX 10. For example for a request from the IP keyset 46, the VOIP gateway 32 plays the voice prompts over the IP stream, through the LAN 36 and the router firewall 42, through the Internet connection before making a conversion to PCM for calls to standard telephone devices, such as located on the PSTN 12 in the form of the devices 14 or 16, or on the PBX system 10, such as the devices 18 and 20. However, if an Internet caller selects a directory entry for another IP device on the LAN 36, or coupled through the Internet 44, such as the work station 48, the address simply is passed to the remote party and the call is placed with no speech conversion to the selected terminal.

The system shown in FIG. 1 works particularly well for business enterprises located all in one building connected to the PBX (and, of course, coupled as described above through the Internet 44, such as the stations 46 and 48), and who do not need to provide real time calling services for web or Internet clients. However, as business needs grow, the customer may require conversion to a larger configuration of the directory service.

It also should be noted that optimum efficiency of the system at the VOIP gateway 32 is achieved by using a variety of conventional directory lookup techniques combined with efficient data compression and a priority scheme. Once again, such data compression and priority schemes are well known; and the details are not necessary to an understanding of the invention. Basically, the system of FIG. 1 is designed to support twenty or so simultaneous conversions and an equal number of simultaneous directory lookup or connection requests.

Figure 2:
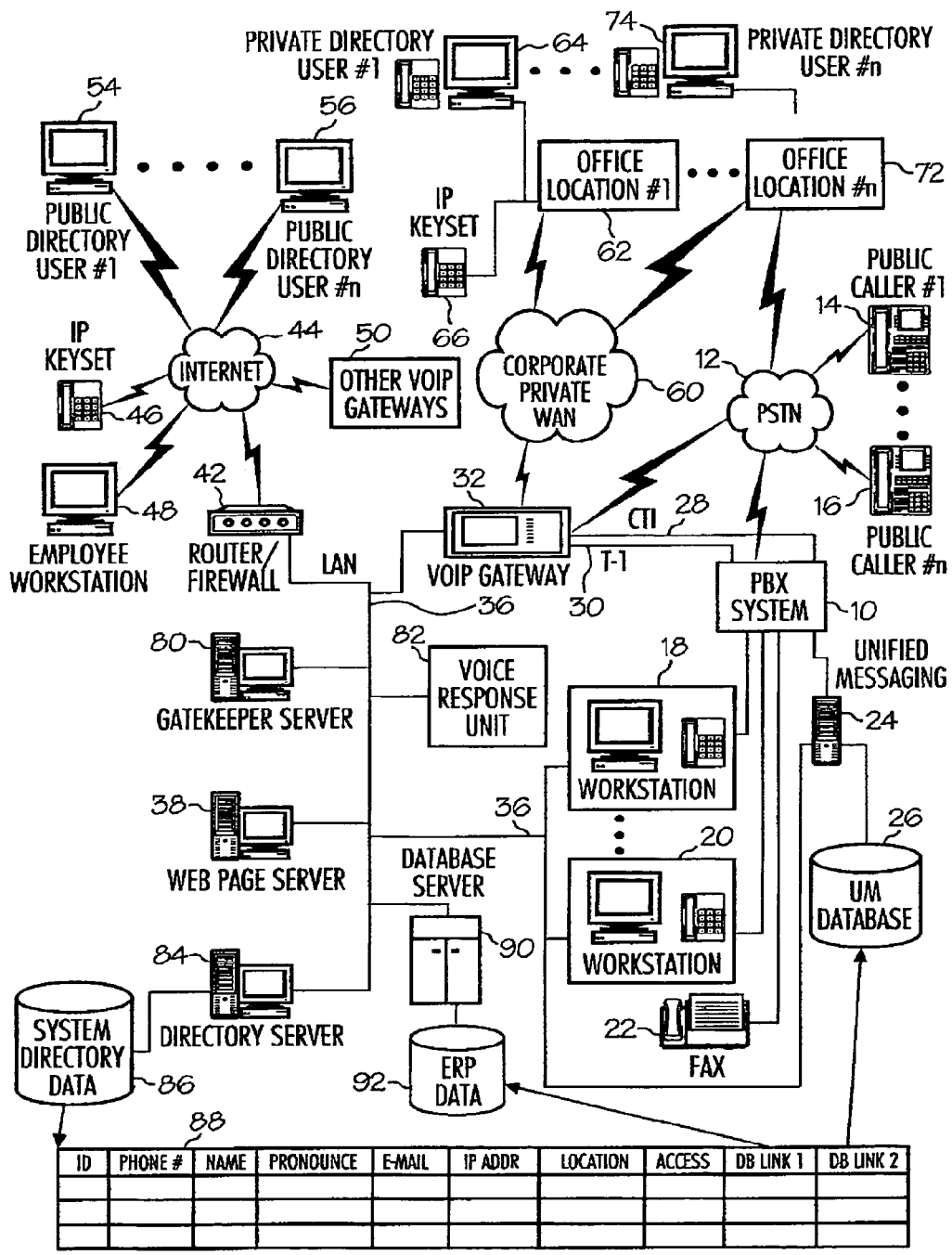
FIG. 2 is a schematic diagram of another preferred embodiment of the invention.

For larger business enterprises having multiple locations and many web client or Internet client access points for real time calling, a larger network configuration is more suitable than the system of FIG. 1. Such a larger network configuration is shown in FIG. 2. The components of FIG. 2 which are the same or similar to those of FIG. 1 are provided with the same reference numbers. Like the system of FIG. 1, the expanded configuration of the system in FIG. 2 serves as a directory service to directly connect a variety of callers to different users within the business enterprise. The business enterprise of FIG. 2 is associated with the PBX system 10. However, the directory server and the VRU have been separated from the VOIP gateway 32 and are shown as a directory server 84 coupled with a system directory data memory 86 and a VRU 82, coupled with the LAN 36 as shared resources. To system users of either the system of FIG. 1 or the system of FIG. 2, the operational characteristics are not changed; but the quantity of stations or people served and the number of enterprise locations have been increased in the system shown in FIG. 2. As shown in the system of FIG. 2, the VOIP gateway 32 also is responsive to public directory users, such as 54 and 56, operating through the Internet 44 and the firewall 42 to the LAN 36 to access the directory of the business enterprise served by the system.

In addition, the system of FIG. 2 illustrates links to other locations of the business enterprise through a corporate, private, wide area network (WAN) 60 for different office locations, such as 62 and 72, which allow use of the system by private directory users such as 64 and 74 at those different office locations, as well as by IP keysets, such as the keyset 66, which are similar to the keyset 46 described previously operating through the Internet 44.

Whether the call requests are made from or to the corporate WAN 60 or through the Internet 44 or the LAN 36, to or from the PSTN 12 or the PBX system 10, the operation of the VOIP gateway 32 is the same as described previously in conjunction with the system of FIG. 1. In the system of FIG. 2, the directory database also may be expanded. It is designed to look up data on the main computer system of the business enterprise, as well as the main PBX and unified messaging systems described in conjunction with the system of FIG. 1. These database links, coupled with the basic directory structure for users are accomplished by relational links to designated key fields within the data structure. This allows the system to be administered using methods which are consistent with back-end database maintenance methodology employed within most business organizations. The system directory data in the directory memory 86 is diagrammatically illustrated in the form 88 in FIG. 2, and is linked with the unified messaging database 26, and with the business enterprise data (ERP data) 92 administered by the database server 90 coupled to the LAN for the business enterprise.

Figure 3:
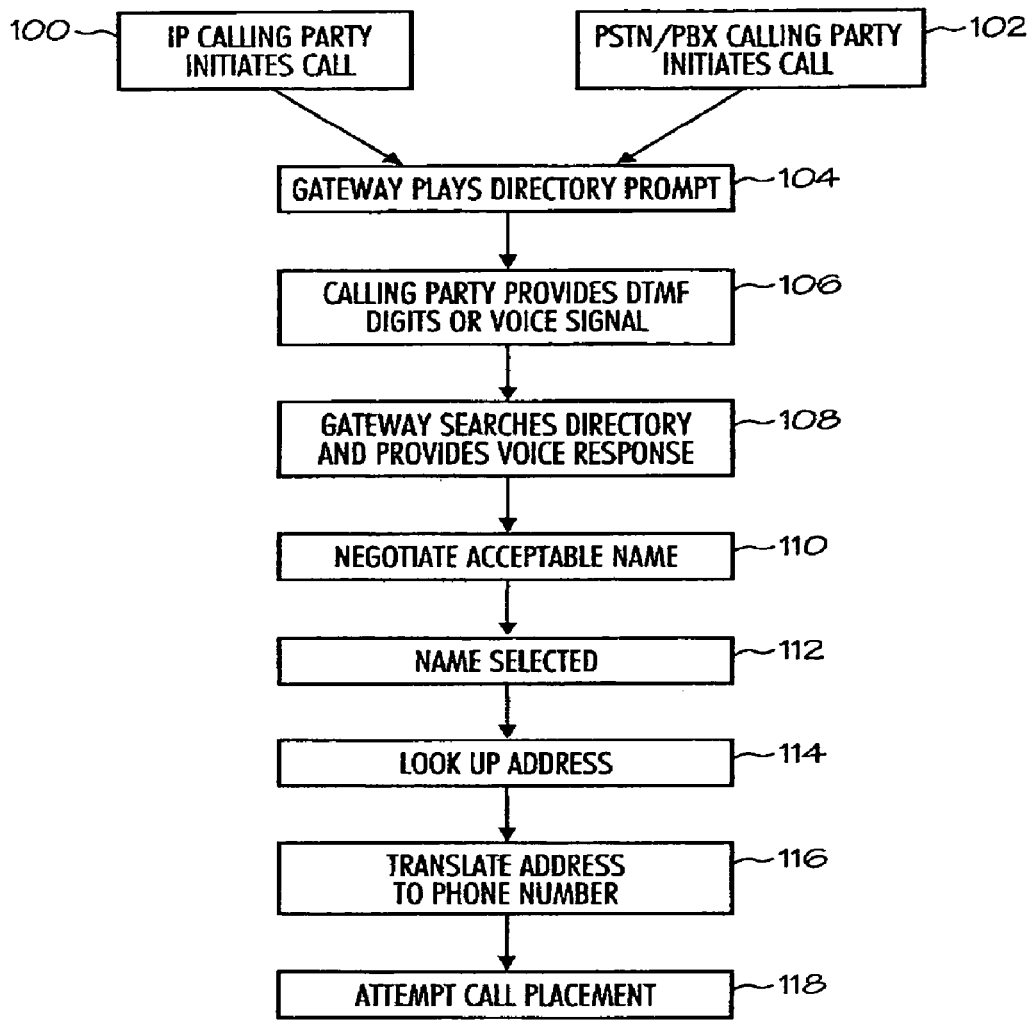
FIG. 3 is a flow chart describing the method of operation of the embodiments of FIGS. 1 and 2.

Reference now should be made to the flow chart of FIG. 3, which illustrates the various steps which take place in accordance with call flow process, whether a call is originating from an IP device, from the PSTN 12, or from a station on the PBX system 10. All of the on-line translations occur in accordance with the steps illustrated in FIG. 3. Calls are either initiated by an IP device 100 or a PSTN/PBX station 102. However a call is initiated, it is directed to the gateway, which plays the directory prompt at 104 for ascertaining the identification of the station or called party desired. The calling party then provides either DTMF digits or voice signals at 106, and the gateway 32, in response to these signals, searches the directory to determine whether there is a match at 108. A voice response is provided at 108 for the closest match; and the calling party negotiates an acceptable name at 110. This is accomplished in a standard manner, and includes prompts for both "find next" and "find previous" functions, as required, to determine the acceptable name.

It should be noted that at this point, the system also may operate in a conventional manner to divert the call to an intervening operator if no acceptable match can be found. Since such operator diversion is well known, it has not been indicated or illustrated in FIG. 3.

Assume that an acceptable name is found at 110, the calling party (either 100 or 102) then indicates selection of the name at 112. The VOIP gateway 32 looks up the address translation in the directory at 114, where such a translation may be required, and automatically translates the address to the appropriate phone number at 116 and attempts the call placement at 118. This is a real time operation, and functions to seamlessly interconnect IP devices and PCM devices in a manner such that neither party is aware that this is not a PCM-to-PCM or IP-to-IP link-up. As stated previously, the VOIP gateway 32 includes a digital signal processor (DSP), and arrays to convert between voice an data signals in a real time on-line basis. The system for performing this conversion may be of the type, for example, disclosed in the co-pending application mentioned above.

The system which is disclosed in both FIGS. 1 and 2 also enables the directory managed by the VOIP gateway to be accessed, at least in part, by users browsing the directory on the Internet 44 and linking with the information on the web page server 38, as well as callers who are processing a dialog with the VRU function described previously. The data structure employed contains appropriate fields to integrate both functions by using a single administration point, namely the VOIP gateway 32.

It should be noted that the system also may be structured using alternate implementations of the IDS database, including those specified by standards like low-level directory access protocol (LDAP). Also, other database implementations, such as the Microsoft® Active Directory within Windows 2000® may become the defacto standard for a single point of directory control within a business enterprise, and may be used by both embodiments of this invention. It also is envisioned to use a database function provided by an Internet URL address to create a query to an external database service. Because of these possible different implementations, the actual implementation of the directory is not confined to a dedicated directory server, such as the server 84 shown in the embodiment of FIG. 2. A business enterprise directory repository could well reside within the definition of a multi-node computer operating system network with custom fields added to the database scheme. It also is possible to embed the VOIP gateway in the PBX or integrate it with a computer setup. Such implementations are considered to come within the scope of this invention.

The foregoing description of the preferred embodiments of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

The invention claimed is:

1. A method for supporting a real time communication for and between both a pulse code modulation (PCM) telephone network and an Internet protocol (IP) telephone packet network in an enterprise including the steps of:
   providing a gateway responsive to calls from a calling party on either the IP telephone network or the PCM telephone network for answering calls;
   obtaining directory prompt messages from an IP gateway;
   responding to DTMF or voice recognition signals from the calling party and searching a directory database for a closest match of a name;
   playing the directory prompt messages to the calling party and audibly announcing the closest match;
   negotiating an acceptable name with the calling party and prompting the calling party for acceptance of the closest match;
   looking up an address translation in the directory database in response to the name selected by the calling party; and
   attempting the real time communication to a called party utilizing the address translation corresponding to the name, if required.

2. The method according to claim 1 wherein the step of negotiating an acceptable name includes the gateway prompting the calling party for a next name and a previous name of the closest match of the name found in the directory database.

3. The method according to claim 1 wherein the directory database comprising a plurality of databases of the enterprise relationally linked.

4. A VOIP directory service system comprising:
   a VOIP gateway receiving a calling party request from either a PCM network or an IP network comprising a desired called party;
   a decoder coupled to the VOIP gateway, the decoder interpreting the calling party request into computer-readable format such that the gateway is able to perform a look-up from a plurality of directory service memories to determine a match with the calling party request;
   a voice response unit coupled to the decoder and the VOIP gateway to audibly reply to the calling party a name associated with the match and an approval prompt to accept the name; and
   a translation database coupled to the VOIP gateway, upon receipt of acceptance of the name the translation database looks up a connection address for the name corresponding to the desired called party, and the system proceeds with a communication between the calling party and the desired called party.

5. The VOIP directory service system of claim 4, wherein the approval prompt comprises a"find next" and a"find previous" prompt for the calling party to select.

6. The VOIP directory service system of claim 4, wherein the look-up is from a plurality of directory service memories using a number of relational links to each of the directory service memories.

7. The VOIP directory service system of claim 4 further comprising a PBX system coupled to the VOIP gateway and receiving communication routing commands from the gateway.

8. The VOIP directory service system of claim 7, wherein the VOIP gateway is embedded within the PBX system.

9. The VOIP directory service system of claim 4, wherein the calling party request comprises one of a voice response or a key response.

\* \* \* \* \*